United States Patent
Burch et al.

(10) Patent No.: US 9,946,974 B2
(45) Date of Patent: Apr. 17, 2018

(54) DETERMINING WELL PARAMETERS FOR OPTIMIZATION OF WELL PERFORMANCE

(71) Applicants: Damian N. Burch, Missouri City, TX (US); Antonio R. C. Paiva, Spring, TX (US); Rainer van den Bosch, Abu Dhabi (AE)

(72) Inventors: Damian N. Burch, Missouri City, TX (US); Antonio R. C. Paiva, Spring, TX (US); Rainer van den Bosch, Abu Dhabi (AE)

(73) Assignee: ExxonMobil Upstream Research Company, Spring, TX (US)

( * ) Notice: Subject to any disclaimer, the term of this patent is extended or adjusted under 35 U.S.C. 154(b) by 925 days.

(21) Appl. No.: 14/281,382

(22) Filed: May 19, 2014

(65) Prior Publication Data

US 2014/0365409 A1 Dec. 11, 2014

Related U.S. Application Data

(60) Provisional application No. 61/833,368, filed on Jun. 10, 2013.

(51) Int. Cl.
*E21B 41/00* (2006.01)
*G06N 99/00* (2010.01)
*E21B 43/00* (2006.01)

(52) U.S. Cl.
CPC ....... *G06N 99/005* (2013.01); *E21B 41/0092* (2013.01); *E21B 43/00* (2013.01)

(58) Field of Classification Search
None
See application file for complete search history.

(56) References Cited

U.S. PATENT DOCUMENTS

| 6,002,985 A | 12/1999 | Stephenson |
| 6,795,773 B2 * | 9/2004 | Soliman ................ E21B 43/26 166/250.1 |

(Continued)

FOREIGN PATENT DOCUMENTS

| WO | 2002/077728 | 10/2002 |
| WO | 2008/028122 | 3/2008 |

(Continued)

OTHER PUBLICATIONS

Yu C. Pan, S. Joe Qin, Phi Nguyen, and Michael Barham, "Hybrid Inferential Modeling for Vapor Pressure of Hydrocarbon Mixtures in Oil Production", Industrial & Engineering Chemistry Research. vol. 52, Apr. 4, 2013, pp. 12420-12425.*

(Continued)

*Primary Examiner* — Paulinho E Smith
(74) *Attorney, Agent, or Firm* — ExxonMobil Upstream Research Company—Law Department

(57) ABSTRACT

Systems and methods for determining well parameters for optimization of well performance. The method includes training, via a computing system, a well performance predictor based on field data corresponding to a hydrocarbon field in which a well is to be drilled. The method also includes generating, via the computing system, a number of candidate well parameter combinations for the well and predicting, via the computing system, a performance of the well for each candidate well parameter combination using the trained well performance predictor. The method further includes determining, via the computing system, an optimized well parameter combination for the well such that the predicted performance of the well is maximized.

35 Claims, 8 Drawing Sheets

(56) References Cited

U.S. PATENT DOCUMENTS

| | | | |
|---|---|---|---|
| 6,810,332 | B2 | 10/2004 | Harrison |
| 6,823,296 | B2 | 11/2004 | Rey-Fabret et al. |
| 6,901,391 | B2 | 5/2005 | Storm, Jr. et al. |
| 7,177,787 | B2 | 2/2007 | Rey-Fabret et al. |
| 7,395,252 | B2 | 7/2008 | Anderson et al. |
| 7,467,044 | B2 | 12/2008 | Tran et al. |
| 8,335,677 | B2 | 12/2012 | Yeten et al. |
| 8,374,974 | B2 | 2/2013 | Chen et al. |
| 8,392,165 | B2 | 3/2013 | Craig et al. |
| 8,412,501 | B2 | 4/2013 | Oury et al. |
| 8,504,341 | B2 | 8/2013 | Cullick et al. |
| 8,510,242 | B2 | 8/2013 | Al-Fattah |
| 8,577,660 | B2 | 11/2013 | Wendt et al. |
| 8,700,549 | B2 | 4/2014 | Hossain et al. |
| 8,798,978 | B2 | 8/2014 | Ertas et al. |
| 8,855,986 | B2 | 10/2014 | Castellini et al. |
| 8,949,173 | B2 | 2/2015 | Fruehbauer et al. |
| 8,977,523 | B2 | 3/2015 | Ertas et al. |
| 9,014,982 | B2 | 4/2015 | Da Costa Paiva et al. |
| 9,043,188 | B2 | 5/2015 | Yeten et al. |
| 9,824,135 | B2 * | 11/2017 | Imhof .............. G06F 17/30598 |
| 2003/0225606 | A1 * | 12/2003 | Raghuraman .......... G01V 11/00 705/7.28 |
| 2007/0185696 | A1 | 8/2007 | Moran et al. |
| 2008/0234988 | A1 | 9/2008 | Chen et al. |
| 2008/0294387 | A1 | 11/2008 | Anderson et al. |
| 2010/0185428 | A1 | 7/2010 | Vink |
| 2011/0099132 | A1 | 4/2011 | Fruehbauer et al. |
| 2011/0144913 | A1 | 6/2011 | Klein et al. |
| 2011/0264430 | A1 | 10/2011 | Tapscott et al. |
| 2012/0143508 | A1 | 6/2012 | Klein et al. |
| 2012/0221306 | A1 | 8/2012 | Hurley et al. |
| 2012/0296618 | A1 | 11/2012 | Hocker |
| 2012/0316789 | A1 | 12/2012 | Suarez-Rivera et al. |
| 2013/0046524 | A1 | 2/2013 | Gathogo et al. |
| 2013/0073269 | A1 | 3/2013 | Oury et al. |
| 2013/0096899 | A1 | 4/2013 | Usadi et al. |
| 2013/0245949 | A1 | 9/2013 | Abitrabi et al. |
| 2013/0253837 | A1 | 9/2013 | Abitrabi et al. |
| 2013/0289962 | A1 | 10/2013 | Wendt et al. |
| 2013/0304679 | A1 | 11/2013 | Fleming et al. |
| 2013/0338985 | A1 | 12/2013 | Garcia et al. |
| 2014/0067353 | A1 | 3/2014 | Shelley et al. |
| 2014/0149041 | A1 | 5/2014 | Sung et al. |
| 2014/0214387 | A1 * | 7/2014 | Tilke .................... E21B 43/305 703/10 |
| 2014/0278115 | A1 | 9/2014 | Bas et al. |
| 2014/0365132 | A1 | 12/2014 | Imhof et al. |
| 2014/0365409 | A1 * | 12/2014 | Burch ................ E21B 41/0092 706/12 |
| 2016/0313463 | A1 | 10/2016 | Wahrmund et al. |
| 2016/0377753 | A1 | 12/2016 | Paiva |
| 2017/0247995 | A1 * | 8/2017 | Crews .................... E21B 43/26 |

FOREIGN PATENT DOCUMENTS

| | | |
|---|---|---|
| WO | WO 2013/010672 | 1/2013 |
| WO | WO 2013/172948 | 11/2013 |
| WO | WO 2014/039036 | 3/2014 |
| WO | WO 2014/088571 | 6/2014 |
| WO | WO 2014/146004 | 9/2014 |

OTHER PUBLICATIONS

Eivind H. Okstad, "Decision Framework for Well Delivery Processes, Application of Analytical Methods to Decision Making", phd Thesis published by Department of Petroleum Engineering and Applied Geophysics, Norwegian University of Science and Technology (NTNU), Trondheim, NO, Sep. 2006, pp. 1-260.*

Shahab D. Mohaghegh, "Reservoir Simulation and Modeling Based on Pattern Recognition", Society of Petroleum Engineers, SPE 143179, 2011, pp. 1-13.*

Van den Bosch, R., et al. (2012) "Benchmarking Unconventional Well Performance Predictions", *SP 152489*, SPE/EAGE European Unconventional Resources Conference and Exhibition held in Vienna, Austria, Mar. 20-22, 2012. pp. 1-21.

Huckabee, P., et al. (2010), "Tight Gas Well Performance Evaluation With Neural Network Analysis for Hydraulic Propped Fracture Treatment Optimization," SPE 135523, pp. 1-30.

LaFollette, R.F., et al. (2012), "Practical Data Mining: Analysis of Barnett Shale Production Results With Emphasis on Well Completion and Fracture Stimulation." *SPE 152531*, pp. 1-10.

Mohaghegh, S.D., et al., (2011), "Modeling, History Matching, Forecasting and Analysis of Shale Reservoirs Performance Using Artificial Intelligence," *Society of Petroleum Engineers (SPE) 143875*, pp. 1-12.

Shelley, R., et al., (2012), "Data-Driven Modeling Improves the Understanding of Hydraulic Fracture Stimulated Horizontal Eagle Ford Completions," *SPE 152121*, pp. 1-11.

* cited by examiner

200

500

DETERMINING WELL PARAMETERS FOR OPTIMIZATION OF WELL PERFORMANCE

CROSS-REFERENCE TO RELATED APPLICATION

This application claims the priority benefit of U.S. Provisional Patent Application 61/833,368 filed Jun. 10, 2013 entitled DETERMINING WELL PARAMETERS FOR OPTIMIZATION OF WELL PERFORMANCE, the entirety of which is incorporated by reference herein.

FIELD OF THE INVENTION

The present techniques are directed to systems and methods fir determining well parameters for optimization of well performance. More specifically, the present techniques are directed to systems and methods for determining a suitable combination of parameters for the location, drilling, and completion of a well based on the predicted performance of the well.

BACKGROUND OF THE INVENTION

This section is intended to introduce various aspects of the art, which may be associated with exemplary embodiments of the present, techniques. This discussion is believed to assist in providing a framework to facilitate a better understanding of particular aspects of the present techniques. Accordingly, it should be understood that this section should be read in this light, and not necessarily as admissions of prior art.

Hydrocarbon production involves numerous expensive activities, which are undertaken before the quantity and quality of produced hydrocarbons is known. For example, well planning is the complex process of deciding the location at which a well is to be drilled and the manner in which the well is to be drilled and completed. An operator typically acquires acreage in a hydrocarbon-producing area, i.e., a hydrocarbon field, and drills a well into at least one hydrocarbon-bearing zone of a reservoir. Completion of the well is then conducted in a manner that is conducive to the removal of hydrocarbons from the reservoir and the transportation of the hydrocarbons to the surface.

During well planning, many complex decisions are made regarding parameters such as the location of the well; the depth, length, and orientation of the horizontal section; the number of hydraulic fracturing stages for the well; the amount and nature of the stimulation fluid to be used for the well; the amount and nature of the proppant to be used in the well; and the like. Field development teams typically determine such parameters based on the potential hydrocarbon production from a given well. In addition, field development teams rely on information relating to the prospective area, existing geologic and engineering knowledge, and past experience to make such decisions. For example, field developments teams may rely on information relating to field analogs, production data from older wells in the same area, information relating to the complex interactions between various parameters, and past engineering studies to make such decisions. However, such information is subject to uncertainties.

Furthermore, additional external factors may be also taken into account during the well planning process. Such external factors may include information relating to land rights acquisition and the expected revenue stream from projected commodity prices. These external factors further compound the complex well planning process.

According to current practices, a divide-and-conquer approach is often used for the well planning process. In this way, specific geologic factors, engineering factors, and economic factors are decoupled from the overall well planning process, and are optimized in separate processes. This allows several specialized teams to make decisions regarding specific subsets of well parameters. However, this approach does not account for subsurface and engineering interactions, or associated uncertainties. In addition, this approach typically disregards useful correlations between parameters, especially between parameters studied separately by different teams. Further, each specialized team may have a slightly different goal in mind for the well plan during the decision-making process. For example, geologists might look for locations with the largest in-place reserves, completions engineers might try to maximize hydrocarbon production, and operations engineers might try to minimize costs. This leads to a well plan that does not adequately meet the corporation's desired overall goals.

In addition, according to current techniques, physical modeling techniques are often used to estimate certain geological or production quantities during the well planning process. For example, Society of Petroleum Engineers (SPE) 143,875, entitled "Modeling, History Matching, Forecasting and Analysis of Shale Reservoirs Performance Using Artificial Intelligence," by Mohaghegh et al, describes the application of artificial intelligence techniques for supplementing a physics-based reservoir model. The resulting model can be used to identify higher-quality regions of the reservoir, quantify depletion over time, or estimate the impact of geological parameters on production.

SPE 152,121, entitled "Data-Driven Modeling Improves the Understanding of Hydraulic Fracture Stimulated Horizontal Eagle Ford Completions," by Shelley et al., describes the use of nonlinear regression in neural networks to evaluate the sensitivity of hydrocarbon production to changes in various geological and engineering parameters. It is alleged that the economic evaluation of the Data Driven Model predictions can be used by a user to determine a completion or fracking procedure that maximizes return on investment (ROI).

SPE 152,531, entitled "Practical Data Mining: Analysis of Barnett Shale Production Results With Emphasis on Well Completion and Fracture Stimulation," by LaFollette et al., describes techniques for estimating hydrocarbon production from location and engineering parameters. The results of such techniques may be subsequently analyzed, for example, to maximize hydrocarbon production.

SPE 135,523, entitled "Tight Gas Well Performance Evaluation With Neural Network Analysis for Hydraulic Propped Fracture Treatment Optimization," by Huckabee et al., describes a model for uncertainty, wherein the uncertainty is incorporated into the decision-making process. The application of neural networks to well performance evaluation and completion optimization is described, including a probabilistic analysis of hydrocarbon production as a function of the amount of proppant used. An economic analysis that is based on the net present value (NPV) of estimated future production is also described.

In U.S. Patent Application Publication No. 2007/0185696 by Moran et al., a method of optimizing drilling includes identifying design parameters for a drilling tool assembly. Design parameters are preserved as experience data. At least one artificial neural network is trained using the experience data. Real-time data is collected from the drilling operation.

The real-time data is analyzed with a real-time drilling optimization system. Optimal drilling parameters are determined based on the analysis of the real-time date with the real-time drilling optimization system.

In U.S. Patent Application Publication No. 2008/0294387 by Anderson et al., a computer-aided controller system recommends actions and manages production in an oil and gas reservoir or field as its properties and conditions change with time. The reservoir or field is characterized and represented as an electronic-field ("e-field"). System applications describe dynamic and static e-field properties and conditions. The application workflows are integrated in a feedback loop between actions taken in the field, and metrics that score the success or failure of those actions. A controller operates on the combination of the application workflows to compute production strategies and actions. The controller is configured to generate a best action sequence for an economically profitable production.

However, such techniques typically fail to provide a well plan that simultaneously selects multiple well parameters to optimally meet a desired overall goal. Accordingly, improved well planning techniques that offer a viable solution for informed decision-making based on a specific goal are desirable.

SUMMARY OF THE INVENTION

An exemplary embodiment provides a method for determining well parameters for optimization of well performance. The method includes training, via a computing system, a well performance predictor based on field data corresponding to a hydrocarbon field in which a well is to be drilled. The method also includes generating, via the computing system, a number of candidate well parameter combinations for the well and predicting, via the computing system, a performance of the well for each candidate well parameter combination using the trained well performance predictor. The method further includes determining, via the computing system, an optimized well parameter combination for the well such that, the predicted performance of the well is maximized.

An exemplary embodiment provides a method for determining well parameters based on expected return on investment (ROI). The method includes training, via a computing system, a hydrocarbon production predictor based on field data corresponding to a hydrocarbon field in which a well is to be drilled, and generating, via the computing system, a number of candidate well parameter combinations for the well. The method also includes predicting, via the computing system, a hydrocarbon production and a corresponding uncertainty of the well for each candidate well parameter combination using the trained hydrocarbon production predictor, and calculating, via the computing system, a cost of the well for each candidate well parameter combination. The method also includes estimating, via the computing system, an expected return on investment (ROI) of the well for each candidate well parameter combination based on the hydrocarbon production, the corresponding uncertainty, and the cost of the well for each candidate well parameter combination. The method further includes determining, via the computing system, an optimized well parameter combination for the well such that the expected ROI is maximized.

Another embodiment provides a computing, system for determining well parameters based on expected return on investment. The computing system includes a processor, a storage medium including a hydrocarbon production predictor, and a non-transitory, computer-readable medium. The non-transitory, computer-readable medium includes code configured to direct the processor to generate a number of candidate well parameter combinations for a well and predict a hydrocarbon production and a corresponding uncertainty of the well for each candidate well parameter combination using the hydrocarbon production predictor. The non-transitory, computer-readable medium also includes code configured to direct the processor to calculate a cost of the well for each candidate well parameter combinations and estimate an expected return on investment (ROI) of the well for each candidate well parameter combination based on the hydrocarbon production, the corresponding uncertainty, and the cost of the well for each candidate well parameter combination. The non-transitory, computer-readable medium further includes code configured to direct the processor to determine an optimized well parameter combination for the well such that the expected ROI is maximized.

Another embodiment provides non-transitory, computer-readable medium for storing computer-readable instructions. The computer-readable instructions include code configured to direct a processor to train a hydrocarbon production predictor based on field data corresponding to a hydrocarbon field in which a well is to be drilled and generate a number of candidate well parameter combinations for the well. The computer-readable instructions also include code configured to direct the processor to predict a hydrocarbon production and a corresponding uncertainty of the well for each candidate well parameter combination using the trained hydrocarbon production predictor and calculate a cost of the well for each candidate well parameter combination. The computer-readable instructions also include code configured to direct a processor to estimate an expected return on investment (ROI) of the well for each candidate well parameter combination based on the hydrocarbon production, the corresponding uncertainty, and the cost of the well for each candidate well parameter combination. The computer-readable instructions further include code configured to direct a processor to determine an optimized well parameter combination for the well such that the expected ROI is maximized.

DESCRIPTION OF THE DRAWINGS

The advantages of the present techniques are better understood by referring to the following detailed description and the attached drawings, in which.

DETAILED DESCRIPTION

Figure 1:
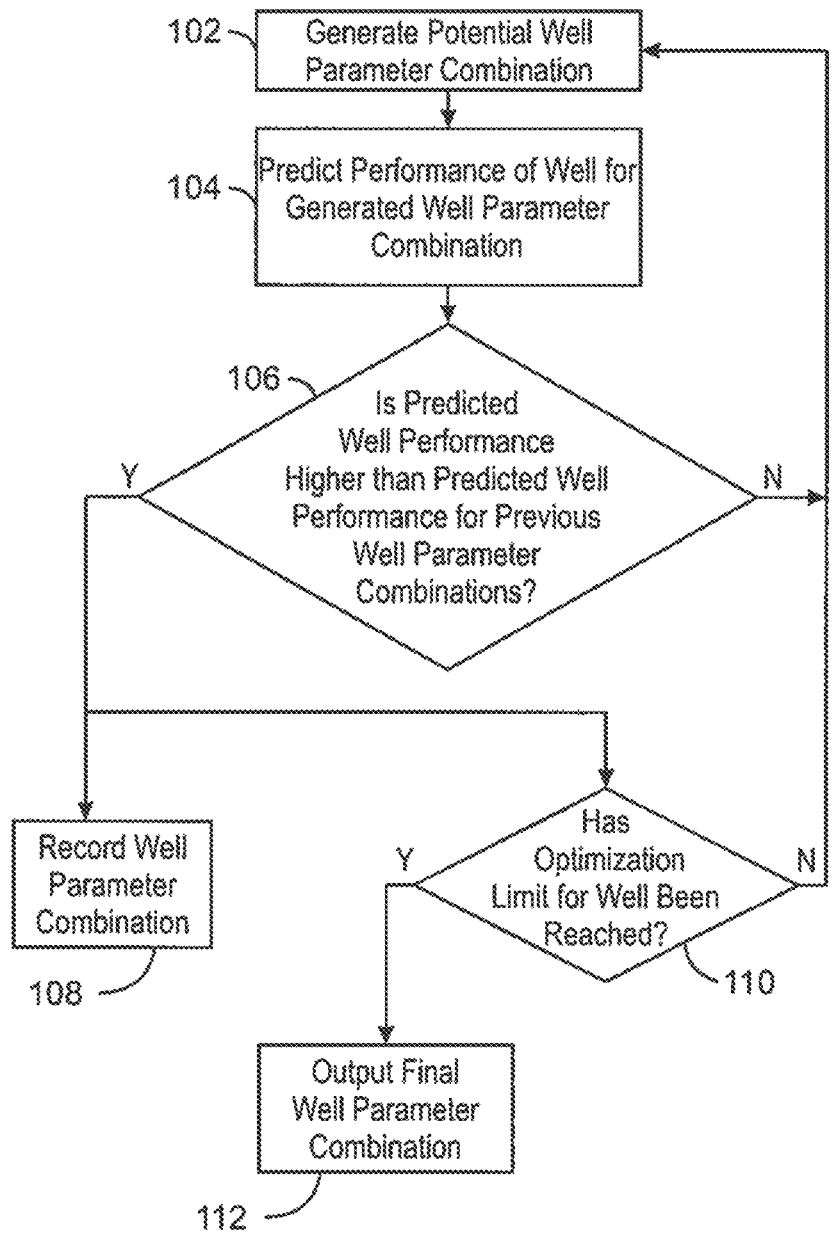
FIG. 1 is a process flow diagram of a method for determining a well parameter combination for a well that satisfies a specified goal corresponding to the performance of the well.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Computer-readable medium" or "non-transitory, computer-readable medium" refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that can encompass either liquids or gases.

A "geologic model" is a computer-based representation of a subsurface earth volume, such as a petroleum reservoir or a depositional basin. Geologic models may take on many different forms. Depending on the context, descriptive or static geologic models built for petroleum applications can be in the form of a 3-D array of cells, to which geologic and/or geophysical properties such as lithology, porosity, acoustic impedance, permeability, or water saturation are assigned (such properties are referred to collectively herein as "reservoir properties"). Many geologic models are constrained by stratigraphic or structural surfaces (for example, flooding surfaces, sequence interfaces, fluid contacts, faults) and boundaries (for example, facies changes). These surfaces and boundaries define regions within the model that possibly have different reservoir properties.

A "hydrocarbon" is an organic compound that primarily includes the elements hydrogen and carbon, although nitrogen, sulfur, oxygen, metals, or any number of other elements may also be present in small amounts. As used herein, hydrocarbons generally refer to organic materials (e.g., natural gas) that are harvested from hydrocarbon containing sub-surface rock layers, termed reservoirs.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane (C1) as a significant component. Raw natural gas also typically contains higher carbon number compounds, such as ethane (C2), propane, and the like, as well as acid gases (such as carbon dioxide, hydrogen sulfide, carbonyl sulfide, carbon disulfide, and mercaptans), and minor amounts of contaminants such as water, nitrogen, iron sulfide, wax, and crude oil.

As used herein, the terms "optimal," "optimizing," "optimize," and "optimization" (as well as derivatives and other forms of those terms and linguistically related words and phrases) are not intended to be limiting in the sense of requiring the present techniques to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present techniques, are more general. The terms can describe working towards a solution which may be the best available solution, a preferred solution, or a solution that offers a specific benefit within a range of constraints, or continually improving or searching for a high point or a maximum for an objective.

"Permeability" is the capacity of a rock to transmit fluids through the interconnected pore spaces of the rock. Permeability may be measured using Darcy's Law: $Q=(k \Delta P\, A)/(\mu L)$, wherein Q=flow rate ($cm^3/s$), $\Delta P$=pressure drop (atm) across a cylinder having a length L (cm) and a cross-sectional area A ($cm^2$), $\mu$=fluid viscosity (cp), and k=permeability (Darcy). The customary unit of measurement for permeability is the millidarcy.

"Porosity" is defined as the ratio of the volume of pore space to the total bulk volume of the material expressed in percent. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores and corresponds to the pore volume available for depletion.

The term "proppant" refers to particulate material that is injected into fractures in subterranean formations surrounding oil wells, gas wells, water wells, and other similar bore holes to provide support to hold (prop) these fractures open and allow gas or liquid to flow through the fracture to the bore hole or from the formation. Proppants are commonly used to prop open fractures formed in subterranean formations such as oil and natural gas wells during hydraulic fracturing.

A "reservoir" is a subsurface rock formation from which a production fluid can be harvested. The rock formation may include granite, silica, carbonates, clays, and organic matter, such as oil, gas, or coal, among others. Reservoirs can vary in thickness from less than one foot (0.3048 meters) to hundreds of feet (hundreds of meters). The permeability of the reservoir provides the potential for production.

The term "well performance" refers generally to any overall metric an organization may use to evaluate a well. Examples of well performance measures that an organization may desire to maximize include early oil production, condensate production from gas wells, lifetime total hydrocarbon production, the net present value of the lifetime hydrocarbon production, or the annualized return on investment or ROI from hydrocarbon production. Examples of well performance measures that an organization may desire to minimize include production of water or non-economic fluids, costs per unit of expected hydrocarbon production, or some measure of financial or operational risk. The present invention may be used to directly optimize some combination of these or other well performance metrics, and is not limited just to hydrocarbon production.

The term "return on investment" or "ROI" refers to a performance measure that is used to evaluate the efficiency of an investment. More specifically, as used herein, ROI may be the net income from the hydrocarbon production from a well, minus the estimated costs, which may include the well drilling costs, acreage leasing costs, capital for infrastructure, and other associated costs or capital expenses.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

The term "stimulation fluid" refers to any fluid, or combination of fluids, that is injected into a formation or interval set to increase a rate of fluid flow through the formation or interval set. For example, a stimulation fluid may be used to fracture the formation, to deliver proppant to fractures in the formation, to acidize the formation, to heat the formation, or to otherwise increase the mobility of fluid in the formation. Stimulation fluid may include various components, such as gels, proppants, breakers, and the like.

A "wellbore" is a hole in the subsurface made by drilling or inserting a conduit into the subsurface. A wellbore may have a substantially circular cross section or any other cross-sectional shape, such as an oval, a square, a rectangle, a triangle, or other regular or irregular shapes. As used herein, the term "well" may refer to the entire hole from the drill center at the surface to the toe or end in the formation. A well is generally configured to convey fluids to and from a subsurface formation.

"Well parameters" can include, but are not limited to, location parameters, borehole parameters, fill parameters, and production parameters. Location parameters can include, for example, wellhead latitude and longitude, average depth of the horizontal section, and relative depth and orientation from heel to toe. Borehole parameters can include, for example, well geometry and completion geometry. Fill parameters can include, for example, particle size, particle shape, particle density, particle compactness, and particle volume. Production parameters can include, for example, whether a borehole is in an overbalanced, balanced, or underbalanced condition, whether the borehole is being produced or is shut in or is an injection well, or the bottomhole pressure (BHP) and/or the bottomhole temperature (BHT). Equipment parameters can include, for example, the type of nozzle(s), the energy and direction of nozzle jet(s), the diameter and type of the coiled tubing and the choice of a cleanout fluid or fluids. Cleanout fluids are typically water, brine, gels, polymers, oils, foams and gases, including mixtures of the above.

Overview

Current well planning processes often result in well plans that do not adequately meet specified goals. Therefore, embodiments described herein provide for the planning of a well based on a specified goal. More specifically, embodiments described herein provide for the determination of a suitable combination of parameters for the location, drilling, and completion of a well based on the expected performance of the well. In various embodiments, the performance of the well is measured in terms of an expected return on investment (ROI) for producing hydrocarbons from the well. However, the performance of the well may also be measured in terms of the expected hydrocarbon production from the well, the expected initial rate of hydrocarbon production from the well, the expected net present value of hydrocarbon production from the well, or the expected net profit of the well, for example.

The well planning process described herein provides for automated optimization of all available parameters that characterize a well. More specifically, the well planning process described herein provides an automated optimization workflow for simultaneously optimizing all tunable parameters of a well with regards to a measure of the production performance of the well as a whole. Therefore, all correlations between the parameters are taken into account during the optimization of the production performance of the well. If certain parameters are correlated such that they are to be changed in some concordant manner to achieve the optimum production performance, the automated optimization workflow identifies those correlations and selects or modifies the parameter values such that they yield the optimum production performance. Moreover, the automated optimization workflow optimizes the parameters with a single goal in mind, namely, the optimization of a single measure of target production performance specified a priori, such as the total amount of hydrocarbons produced or the expected ROI.

In addition, according to the well planning process described herein, a very large number of possible scenarios can be explored. In other words, given a model of the well's production, the automated optimization workflow can search through a very large number of scenarios by evaluating the expected production performance, as measured by the prediction of production performance, for a number of parameter values and combinations thereof. The automated optimization workflow thus inherently implements a search over the space of all plausible well parameters, which can be made as exhaustive and complete as desired (given appropriate time and computing resources).

Furthermore, if desired, the well planning process described herein allows for the automatic incorporation and prediction of uncertainties associated with the prediction of the production performance of the well. There are uncertainties in the predictions that are made during the well planning process. Such uncertainties may result from uncertainties in geologic models and performance predictions. Whenever the uncertainties are estimated during prediction, such uncertainties may be used to provide a complete characterization of the expected outcomes. Moreover, such uncertainties can be directly accounted for according to the automated optimization workflow described herein.

Techniques for Determining Parameters for a Well

FIG. 1 is a process flow diagram of a method 100 for determining a well parameter combination for a well that satisfies a specified goal corresponding to the performance of the well. In various embodiments, the specified goal includes the maximization of the ROI for the well. However, the specified goal may also include the maximization of the amount of hydrocarbons produced, the maximization of the production flow rate after 5 years, the maximization of the initial rate of hydrocarbon production from the well, the maximization of the net present value of hydrocarbon production from the well, the maximization of the expected net profit of the well, or the minimization of risk, for example.

The method 100 iterates around a model for predicting the performance of a well based on potential well parameter combinations for the well. The model is referred to herein as a "well performance predictor." The well performance predictor may be used to make various predictions regarding the performance of the well. In various embodiments, machine learning or pattern recognition is used to train the well performance predictor on available, relevant data. This data may include, but is not limited to, a geologic description, e.g., geologic model, of a hydrocarbon field, and locations and descriptions of nearby wells (including engineering descriptions and historical production information).

The method begins at block 102 with the generation of a potential well parameter combination for a well plan. In various embodiments, the potential well parameter combination includes various parameters relating to the well, such as the well location, the depth and direction from the well's heel to its toe, the number of hydraulic fracturing stages for the well, the amount of stimulation fluid to be used for the well, the amount of proppant to be used for the well, and the like.

At block 104, a performance of the well is predicted based on the generated well parameter combination. More specifically, the potential well parameter combination is passed to the trained well performance predictor, and the well performance predictor may generate a prediction and associated uncertainty for a particular measure of the performance of the well resulting from the implementation of that parameter combination. The particular measure of the performance of the well may include, for example, the predicted return on investment (ROI) of the well, the predicted hydrocarbon production from the well, the predicted initial rate of hydrocarbon production from the well, or the predicted net present value of hydrocarbon production from the well.

At block 106, it is determined whether the predicted well performance for the potential well parameter combination is higher than the predicted well performance for previous well parameter combinations that were considered for the well. If the predicted well performance for the potential well parameter combination is not higher than the highest previously predicted well performance, the method 100 is executed again beginning at block 102 with the generation of a new potential well parameter combination. Otherwise, the well parameter combination is recorded at block 108.

In addition, if the predicted well performance for the potential well parameter combination is higher than the highest previously predicted well performance, the method proceeds to block 110. At block 110, it is determined whether the optimization limit for the well has been reached. If the optimization limit for the well has not been reached, the method 100 is executed again beginning at block 102 with the generation of a new potential well parameter combination. Otherwise, the final well parameter combination is output at block 112. Iterating through the method 100 in this manner provides a well planning process that searches through the space of all possible well parameter combinations. In this manner, an optimal well parameter combination that provides the highest possible predicted well performance may be determined.

The process flow diagram of FIG. 1 is not intended to indicate that the blocks of the method 100 are to be executed in any particular order, or that all the blocks shown in FIG. 1 are to be included within the method 100 in every case. Moreover, any number of additional blocks may be included within the method 100, depending on the details of the specific implementation.

In various embodiments, the method 100 is applied to the maximization of the ROI of the well. For example, a predicted hydrocarbon production from the well and a predicted cost of the well may be determined based on the particular well parameter combination, and the ROI of the well may be estimated based on the predicted hydrocarbon production from the well, the expected market value of the produced hydrocarbons, and the predicted cost of the well. The final well parameter combination may then be determined such that the ROI of the well is maximized.

In various embodiments, the method 100 may utilize information relating to previously generated well parameter combinations and the corresponding predicted well performances to guide the generation of subsequent well parameter combinations. For example, specific well parameter combinations may be labeled as corresponding to high or low well performances. Subsequent well parameter combinations that are similar to the well parameter combinations corresponding to high well performances may then be generated.

Further, in some embodiments, the method 100 may be parallelized to produce faster results. Specifically, a number of well parameter combinations may be generated, and the corresponding well performances may be simultaneously predicted. The well parameter combination with the highest predicted well performance may then be quickly identified and selected for the well plan.

The accuracy of the predicted well performance for a given well parameter combination is largely dependent on the accuracy and reliability of the well performance predictor. In various embodiments, the structure of the well performance predictor is based on three factors. The first factor includes the types of inputs that are provided the well performance predictor, both in the form of prior knowledge and well parameters to be optimized. The second factor includes the architecture that is chosen for the well performance predictor. The third factor includes the overall goal for the well planning process and the manner in which the goal is to be measured.

In some embodiments, a user or operator can select the model structure that is to be used for the well performance predictor. For example, the user may generally establish the three factors relating to the structure of the well performance predictor based on the specified goal for the well planning process, and may then select the model structure that supports the specified goal.

In various embodiments, the well performance predictor directly accounts for uncertainties in the prediction of the well performances for different well parameter combinations. Moreover, the well performance predictor may characterize such uncertainties in predefined formats. For example, the well performance predictor may use prediction distributions or statistics to characterize such uncertainties.

The well performance predictor may be generated in a variety of ways. For example, the well performance predictor may be generated from geophysical and engineering first principles. Alternatively, the well performance predictor may be generated based on a variety of geostatistical, pattern recognition, or machine learning models. Such models may include non-parametric and nonlinear regression methods, artificial neural networks, support vector classifiers, and decision and regression trees, among others. Further, the well performance predictor may be generated by combining several sub-models, where each sub-model addresses a targeted prediction problem.

Given a number of predictions, the selection of the optimized well parameter combination is based on a measure of the specified goal, e.g., the targeted performance of the well. If the output of the well performance predictor is a scalar value, the well parameter combination that maximizes the measure of well performance according to the specified goal may be selected. For example, according to various embodiments described herein, the output of the well performance predictor is the expected return-on-investment (ROI) of the well. Therefore, in such embodiments, the well parameter combination that is predicted to maximize the ROI of the well is selected.

In some embodiments, the well performance predictor yields a vector or list of values that can be combined into the measure of the performance of the well. A number of measures may be defined, depending on the values and potential outcomes. For example, the vector of values may correspond to a discrete representation of the distribution of potential well performances. A value for the well performance may be determined based on the distribution, such as the mean, median, or maximum likelihood values. Distributions can also be compared directly through information theoretic measures, such as Kullback-Leibler divergence. As another example, the values may correspond to predicted statistics of the well performance. In such a scenario, the statistics may be compared directly, and the distributions of potential well performances may be reconstructed. The distributions of potential well performances may then be compared directly, or may be combined, depending on the specified goal.

For embodiments in which the method 100 is parallelized to test a number of well parameter combinations simultaneously, a corresponding number of well performance prediction results are generated. Therefore, in some embodiments, the measure of the goal is applied to two results at a time. In other words, a current predicted well performance may be compared with the highest predicted well performance found so far, and the well parameter combination associated with the highest predicted well performance of the comparison may be recorded.

Additionally, the method 100 may return a ranked list of possible well parameter combinations, instead of a single combination. Such a list may provide the user or operator with an opportunity to override the automatic execution of the method 100 to factor in elements that are ambiguous or difficult to model, such as the technical feasibility or other potential risks associated with a well parameter combination.

Figure 2:
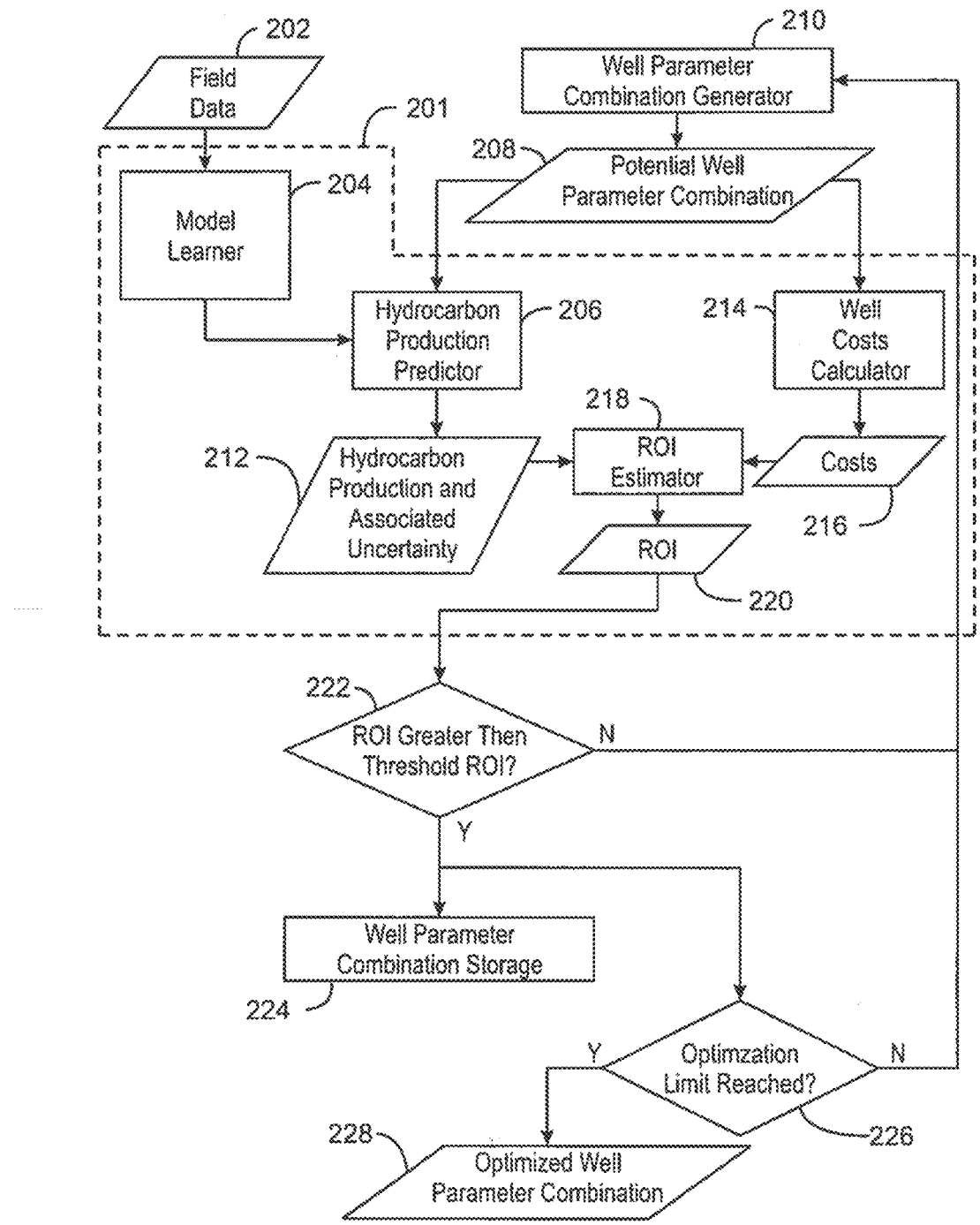
FIG. 2 is a data flow diagram that provides for the generation of a well plan for a well such that the predicted ROI for the well is maximized.

FIG. 2 is a data flow diagram 200 that provides for the generation of a well plan for a well such that the predicted ROI for the well is maximized. Typically, an operator has a particular amount of money available to invest in hydrocarbon recovery in a particular hydrocarbon field. The money is allocated so as to maximize the expected ROI, and is usually subject to corporate constraints on risk. Thus, the operator may determine the number of wells to drill, the location of each well, and the completion of each well within these constraints.

According to the embodiment shown in FIG. 2, a well performance predictor 201 is used to determine optimized well parameters for a well based on the estimated ROI for producing hydrocarbons from the well. As shown in FIG. 2, field data 202 is input to a model learner 204 of the well performance predictor 201. The field data 202 may include geologic data, e.g., a geologic model, relating to the hydrocarbon field in which the well is to be drilled, historical production data relating to nearby wells, or physical models of the hydrocarbon field, for example. In addition, the field data 202 may include geologic variables relating to the hydrocarbon field, such as thermal maturity, porosity, permeability, and pay thickness.

In various embodiments, the model learner 204 uses the field data 202 to train a hydrocarbon production predictor 206 of the well performance predictor 201. Specifically, the model learner 204 uses machine learning techniques to train the hydrocarbon production predictor 206 based on the field data 202. The trained hydrocarbon production predictor 206 is capable of predicting the hydrocarbon production from a new well in the hydrocarbon field, regardless of location or completion, along with some measure of uncertainty for the predicted hydrocarbon production.

Further, a potential well parameter combination 208 is generated by a well-parameter combination generator 210. In various embodiments, the well-parameter combination generator 210 generates the set of all possible well counts, locations, and completion strategies, available to the operator. In any practical implementation, there are an infinite number of possible well parameter combinations, so the well parameter combinations may not be explicitly enumerated. Instead, a finite number of well parameter combinations may be systematically and adaptively generated and compared by the well-parameter combination generator 210.

In various embodiments, once the well parameter combinations have been generated, the well-parameter combination generator 210 selects one potential well parameter combination 208 and inputs that well parameter combination 208 to the hydrocarbon production predictor 204 of the well performance predictor 201. The hydrocarbon production predictor 204 then predicts a hydrocarbon production for the given well parameter combination 208. In addition, the hydrocarbon production predictor 206 may predict additional aspects, such as the uncertainty 212 associated with the prediction or the decline rate in the hydrocarbon production from the well in the future.

The well parameter combination 208 that is generated by the well-parameter combination generator 210 is also input to a well costs calculator 214 of the well performance predictor 201. The well costs calculator 214 then determines costs 216 for the given well parameter combination 208. The costs 216 may include the actual implementation costs, e.g., the initial capital costs and ongoing operating costs, for the well.

The predicted hydrocarbon production and associated uncertainty 212 generated by the hydrocarbon production predictor 206, as well as the costs 216 determined by the well costs calculator 214, are then input to an ROI estimator 218 of the well performance predictor 201. The ROI estimator 218 estimates the ROI 220 for the well with the given well parameter combination 210 by balancing the predicted hydrocarbon production and associated uncertainty 212 against the costs 216 for the well. In this manner, an economic model is used to determine whether the expected lifetime value of a well with the given well parameter combination 208 is expected to meet specific thresholds for ROI and risk management. In various embodiments, the ROI 220 for the well includes the net income from the hydrocarbon production 212 of the well, minus the computed costs 216 of the well. In addition, the ROI 220 may specify some statistical measure of the uncertainty of these returns.

At block 222, it is determined whether the estimated ROI 220 for the well with the given well parameter combination 208 is greater than a threshold ROI for the particular well plan. If it the estimated ROI 220 is not greater than the threshold ROI, the particular well parameter combination 208 is discarded, and the well-parameter combination generator 210 generates another potential well parameter combination. If the estimated ROI 220 is greater than the threshold ROI, the particular well parameter combination 208 is stored in well-parameter combination storage 224.

In addition, at block 226, it is determined whether the optimization limit for the well has been reached. If the optimization limit for the well has been reached, the particular well parameter combination 208 is output as the optimized well parameter combination 228 for the well. The optimized well parameter combination 228 may include the location of the well and the set of engineering parameters to be used for constructing and completing the well. Otherwise, the particular well parameter combination 208 is discarded, and the well-parameter combination generator 210 generates another potential well parameter combination. In this manner, well parameter combinations are generated and tested until an optimized well parameter combination that maximizes the ROI of the well is identified.

FIG. 2 is not intended to indicate that the data flow diagram 200 is to include all the components shown in FIG. 2 in every case. Rather, any of the components of FIG. 2 may be omitted or modified, depending on the details of the specific implementation. For example, in some embodiments, the well-parameter combination generator 210 simultaneously generates well parameter combinations for a number of wells that are to be drilled in a particular hydrocarbon field. The well parameter combinations may then be separately analyzed, or may be combined into a single well parameter combination to simultaneously determine parameters for all the wells to be drilled in the hydrocarbon field. Similarly, components shown as distinct in FIG. 2 may be combined. For example, given appropriate data, the hydrocarbon production predictor 206 and the well costs calculator 214 of the well performance predictor 201 may be combined to allow for the prediction of the ROI (or any other suitable performance measure) directly.

Figure 3:
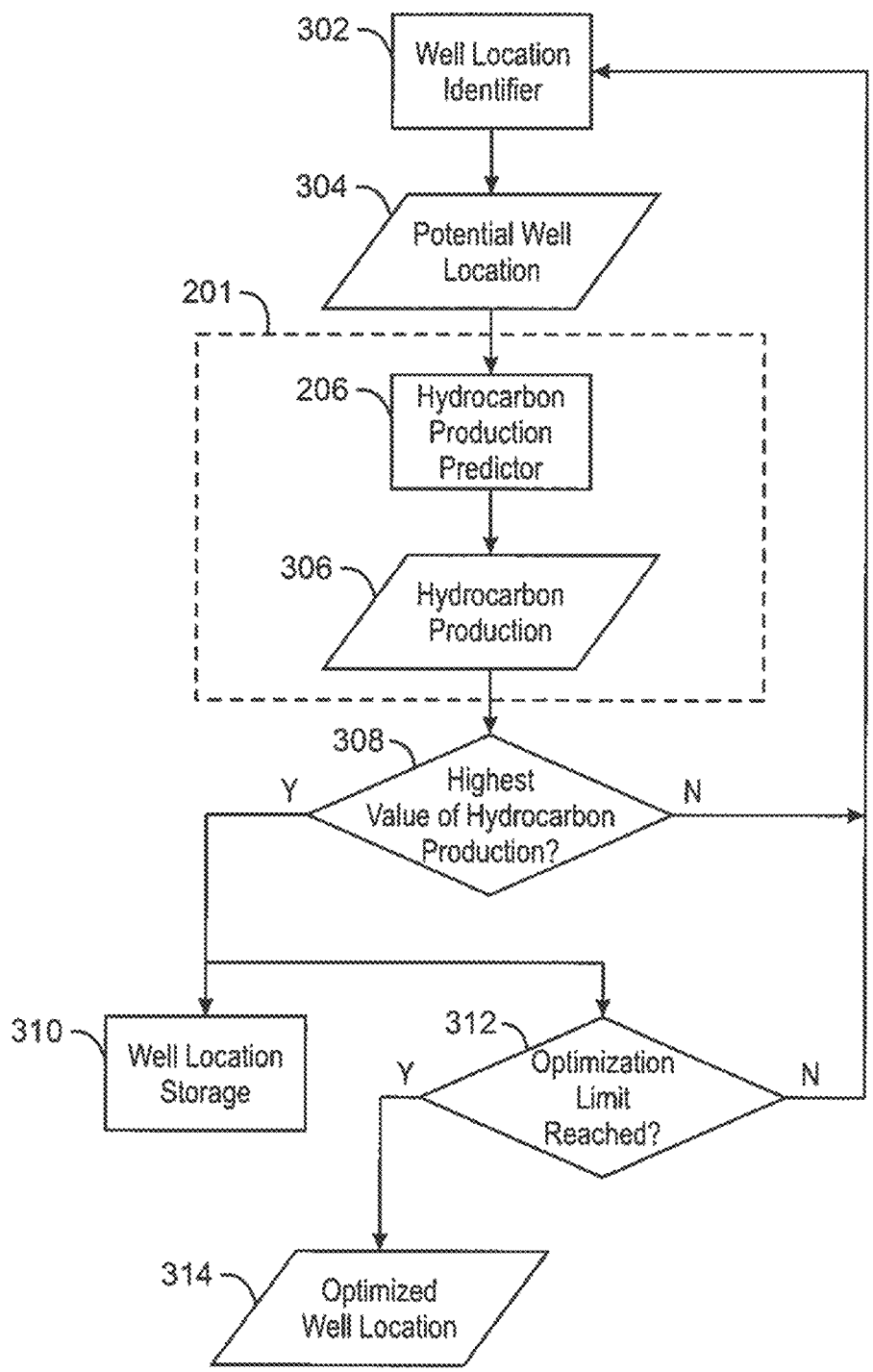
FIG. 3 is a data flow diagram that provides for the determination of a location for a well such that the predicted hydrocarbon production from the well is maximized.

FIG. 3 is a data flow diagram 300 that provides for the determination of a location for a well such that the predicted hydrocarbon production from the well is maximized. Like numbered items are as described with respect to FIG. 2. More specifically, the data flow diagram 300 provides for the assessment of potential locations for new wells to determine if local combinations of geology, optimal engineering practices, and costs are conducive to hosting a productive well. This could be used to assess productive acreage for purchase or unproductive acreage for resale, or to determine which of several possible leases to drill next.

As shown in FIG. 3, a well location identifier 302 identifies a potential well location 304 for a well that is to be drilled in a particular hydrocarbon field. In some embodiments, the well location identifier 302 considers a particular area that includes leased or acquired land, and identifies several locations that may be suitable for drilling a well. The well location identifier 302 may then select one potential well location 304 to be considered for the well.

In various embodiments, the potential well location 304 is input to the trained hydrocarbon production predictor 206 of the well performance predictor 201. The hydrocarbon production predictor 206 then predicts the hydrocarbon production 306 for the well based on the potential well location 304. At block 308, it is determined whether the predicted hydrocarbon production 306 corresponding to the particular well location 304 is the highest value of hydrocarbon production that has been determined for any location. If the predicted hydrocarbon production 306 is not the highest value of hydrocarbon production that has been determined for any location, the particular well location 304 is discarded, and the well location identifier 302 determines another potential well location. Otherwise, the particular well location 304 is stored in well location storage 310.

Although the direct optimization goal of the embodiment depicted in FIG. 3 is to optimize the well location, other factors may be implicitly factored into the optimization goal. For example, the well performance predictor may also consider internally the additional optimization potential of a well at a given location by appropriately controlling other well parameters. More specifically, the well performance predictor may be trained to predict the well performance corresponding to the best mode of all the other well parameters.

In addition, at block 312, it is determined whether the optimization limit for the well that is to be built in the particular hydrocarbon field has been reached. If the optimization limit for the well has been reached, the particular well location 304 is output as the optimized well location 314 for the well. Otherwise, the particular well location 304 is discarded, and the well location identifier 302 determines another potential well location in the hydrocarbon field. In this manner, well locations are generated and tested until an optimized well location that maximizes the hydrocarbon production from the well is identified.

FIG. 3 is not intended to indicate that the data flow diagram 300 is to include all the components shown in FIG. 3 in every case. Rather, any of the components of FIG. 3 may be omitted or modified, depending on the details of the specific implementation. Further, while the data flow diagram 300 is described with respect to the maximization of the predicted hydrocarbon production from the well, it is to be understood that the data flow diagram 300 can also be applied to the maximization of the ROI of the well.

Figure 4:
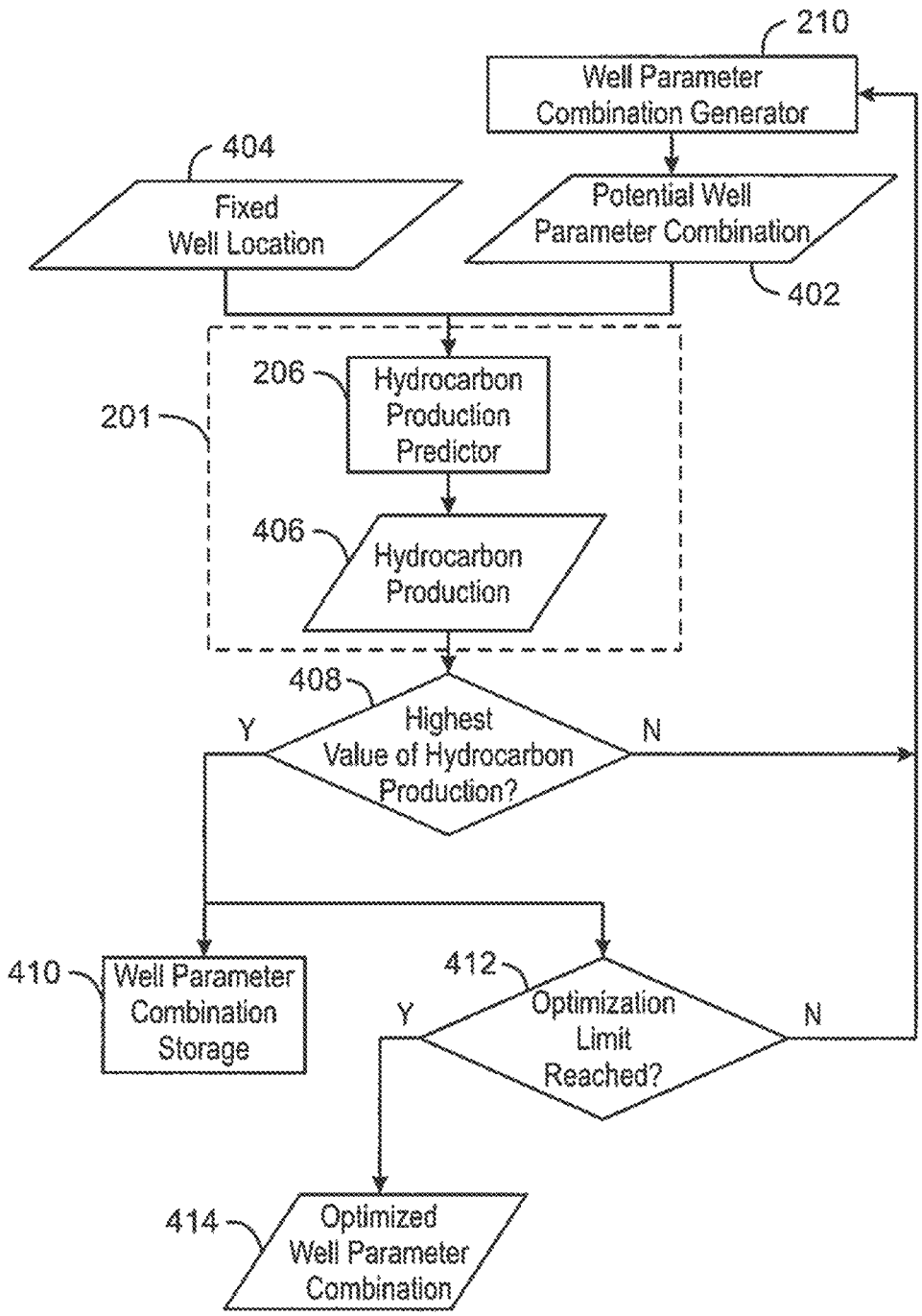
FIG. 4 is a data flow diagram that provides for the generation of a well plan for a well at a fixed location such that the hydrocarbon production from the well is maximized.

FIG. 4 is a data flow diagram 400 that provides for the generation of a well plan for a well at a fixed location such that the hydrocarbon production from the well is maximized. Like numbered items are as described with respect to FIGS. 2 and 3. As shown in FIG. 4, the well-parameter combination generator 210 generates a potential well parameter combination 402 (excluding the well location). The potential well parameter combination 402, as well as a fixed well location 404, is input to the trained hydrocarbon production predictor 206 of the well performance predictor 201. The fixed well location 404 may be predetermined, for example, as described above with respect to the data flow diagram 300 of FIG. 3.

The hydrocarbon production predictor 206 then predicts the hydrocarbon production 406 for the well based on the fixed well location 404 and the potential well parameter combination 402. At block 408, it is determined whether the predicted hydrocarbon production 406 corresponding to the particular well parameter combination 402 and the fixed well location 404 is the highest value of hydrocarbon production that has been determined for any well parameter combination. If the predicted hydrocarbon production 406 is not the highest value of hydrocarbon production that has been determined for any well parameter combination, the particular well parameter combination 402 is discarded, and the well-parameter combination generator 210 determines another potential well parameter combination (excluding the well location). Otherwise, the particular well parameter combination 402 is stored in well-parameter combination storage 410.

In addition, at block 412, it, is determined whether the optimization limit for the well that is to be built at the fixed well location 404 has been reached. If the optimization limit for the well has been reached, the particular well parameter combination 402 is output as the optimized well parameter combination 414 for the well. Otherwise, the particular well parameter combination 402 is discarded, and the well-parameter combination generator 210 determines another potential well parameter combination (excluding the well location). In this manner, well parameter combinations for the well at the fixed well location 404 are generated and tested until an optimized well parameter combination that maximizes the hydrocarbon production from the well at that location is identified.

FIG. 4 is not intended to indicate that the data flow diagram 400 is to include all the components shown in FIG. 4 in every case. Rather, any of the components of FIG. 4 may be omitted or modified, depending on the details of the specific implementation. Further, while the data flow diagram 400 is described with respect to the maximization of the predicted hydrocarbon production from the well, it is to be understood that the data flow diagram 400 can also be applied to the maximization of the ROI of the well.

Embodiments described herein may be used for a variety of applications. For example, embodiments described herein may be used to simultaneously determine the locations and engineering parameters for new wells such that the ROI is maximized and the associated risk is minimized. In addition, embodiments described herein may be used to preferentially maximize the production of certain hydrocarbons over others. For example, it may be desirable to produce more condensate than dry gas. Similarly, embodiments described herein may be used to minimize the production of unwanted fluids, such as water. Furthermore, embodiments described herein are not restricted to modeling engineering parameters used during well construction and completion. Rather, embodiments described herein may also be used to predict the impact of performing a workover, e.g., updating or replacing a well completion, later in the life of a well.

Figure 5:
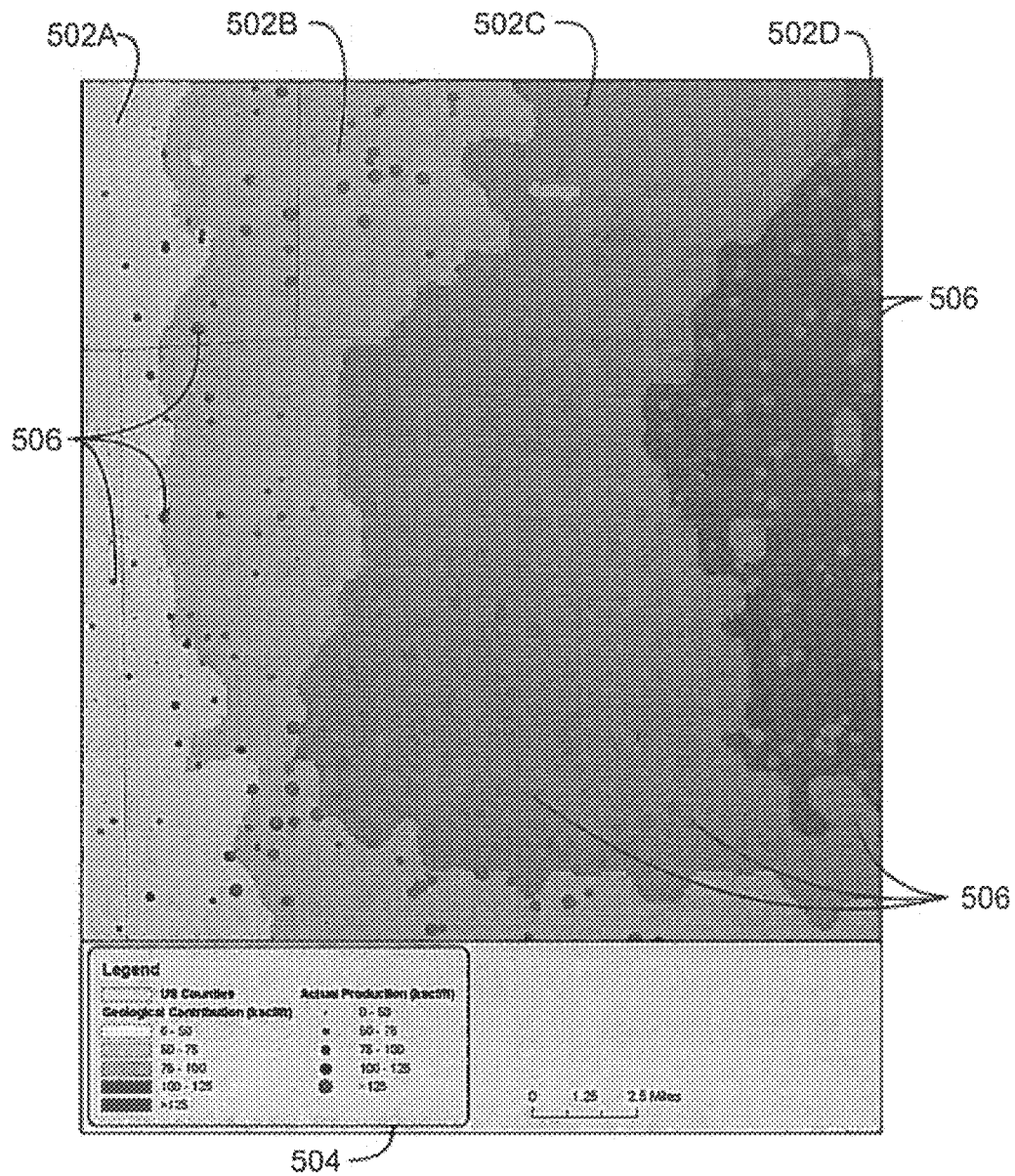
FIG. 5 is a schematic showing an exemplary map of existing well locations that may be used to determine acreage to be used for hydrocarbon production.

FIG. 5 is a schematic showing an exemplary map 500 of existing well locations that may be used to determine acreage to be used for hydrocarbon production. The map 500 includes four separate regions 502A, 502B, 502C, and 502D, wherein each region 502A-D includes a different degree of shading. As shown in the legend 504 at the bottom left of the map 500, the degree of shading of each region 502A-D of the map 500 indicates the geologic contribution to hydrocarbon production for that region 502A-D. The dots 506 on the map 500 represent actual well locations in the hydrocarbon field, wherein larger dots denote wells with higher hydrocarbon productions. Therefore, since the region 502A with the lowest degree of shading has the lowest geologic contribution to hydrocarbon production, the dots 506 in that region 502A are smallest overall. In addition, since the region 502D with the highest degree of shading has the highest geologic contribution to hydrocarbon production, the dots 506 are largest in that region 502D.

In various embodiments, maps such as the map 500 shown in FIG. 5 can be used to analyze a particular hydrocarbon field. For example, the map 500 may be used to distinguish between the effects of changing geology, varying engineering practices, and randomness on hydrocarbon production in the corresponding hydrocarbon field.

In this manner, suitable locations for hydrocarbon production may be determined, and well plans may be determined for wells to be drilled at those locations.

Using proprietary data, a multivariate statistical model, e.g., a well performance predictor, corresponding to the wells in the hydrocarbon field shown in the map 500 of FIG. 5 may be trained. In some embodiments, the Random Forest algorithm is used to train the multivariate statistical model from the proprietary data. However, any number of other statistical or machine learning techniques, such as linear regression, generalized additive models, or neural nets, may also be used to train the multivariate statistical model. The trained multivariate statistical model may then be used to determine the expected ultimate recovery (EUR) of hydrocarbons from the wells as a function of geology (e.g., thermal maturity, gas in place, formation thickness, and some stratigraphic information), completion date (as a proxy for evolving engineering practices that are not otherwise captured by the model), and engineering parameters (e.g., completion length, number of fracturing (frac) stages, frac fluid volume, and total proppant) for a new well.

Once the EUR, of hydrocarbons from the well has been determined, the ROI of the well may be predicted using economic information. For example, in some cases, a fixed base cost for drilling and a fixed marginal cost for every extra frac stage, barrel of frac fluid volume, and pound of proppant may be assumed. However, in other cases, different base costs may be assumed for the four regions 502A-D on the map 500 to reflect varying lease fees and royalty arrangements. In addition, different marginal costs for frac fluid volumes may be assumed if there are local draughts, and different operating costs may be assumed to reflect nearness to pipelines or other production facilities.

In various embodiments, once the location of the new well has been determined using the map 500 of FIG. 5, it may be desirable to determine suitable parameters for the well. In some cases, graphs are used to aid in the determination of suitable well parameters, as described further with respect to FIGS. 6A, 6B, and 7.

Figure 6A:
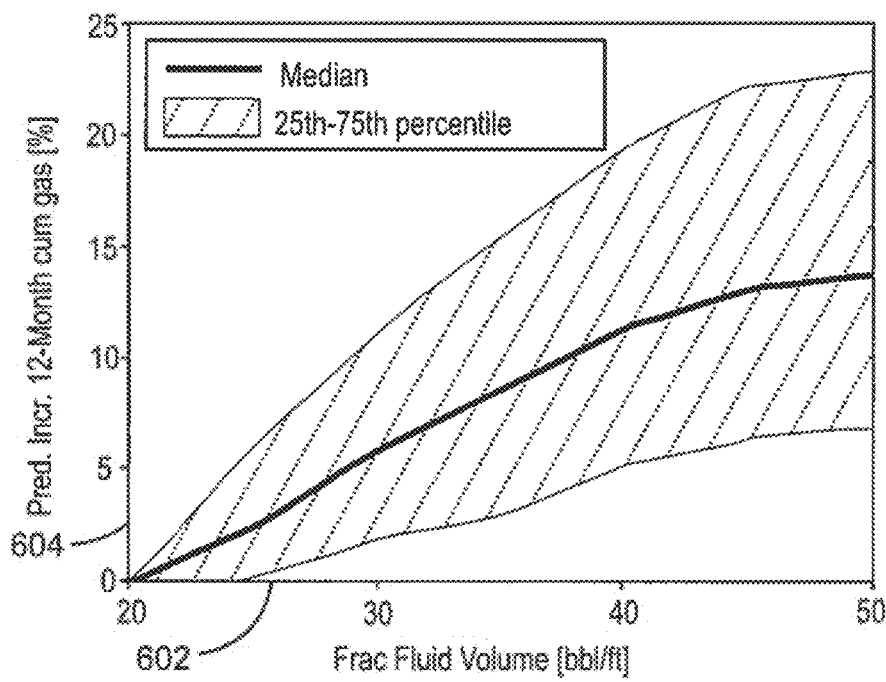
FIG. 6A shows a graph that may be used to aid in the generation of well parameters for hydrocarbon production.

FIG. 6A shows a graph 600 that may be used to aid in the generation of well parameters for hydrocarbon production. An x-axis 602 of the graph 600 represents the total frac fluid volume used during the completion of a well, in barrels per foot (bbl/ft). A y-axis 604 of the graph 600 represents the predicted hydrocarbon production from the well over a 12 month period. The graph 600 shows that hydrocarbon production is expected to increase with higher frac fluid volumes.

Figure 6B:
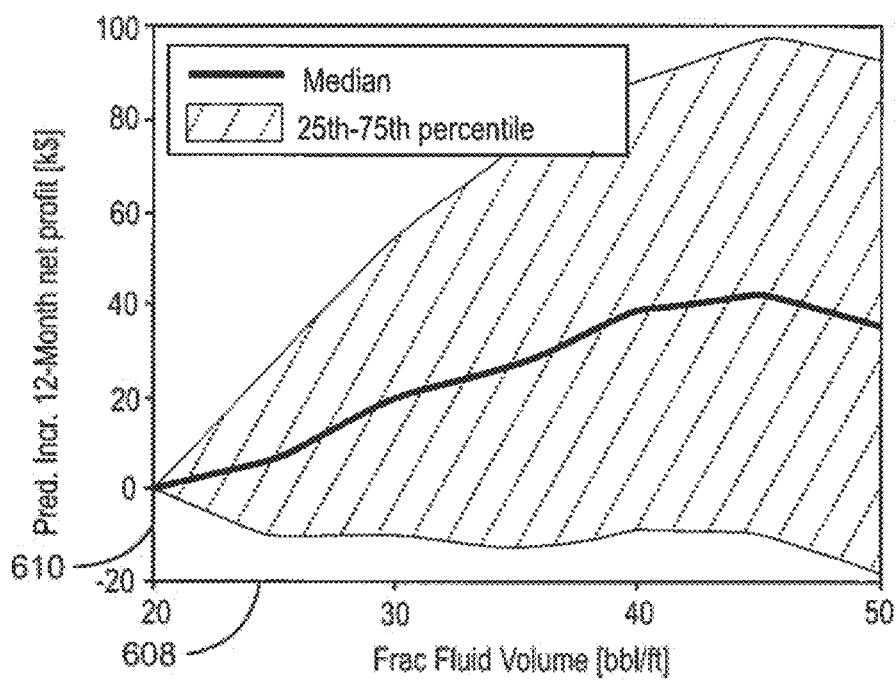
FIG. 6B shows another graph that may be used to aid in the generation of well parameters for hydrocarbon production.

FIG. 6B shows another graph 606 that may be used to aid in the generation of well parameters for hydrocarbon production. An x-axis 608 of the graph 606 represents the total frac fluid volume used during the completion of a well in bbl/ft. A y-axis 610 of the graph 606 represents the expected increase in net profit, or ROI, over the baseline design of 20 bbls/ft for the well over a 12 month period in thousands of dollars. The graph 606 of FIG. 6B, considered in combination with the graph 600 of FIG. 6A, shows that there is an optimaleconomic choice for the frac fluid volume, e.g., about 45 bbl/ft, when the cost of the frac fluid and the value of the extra gas are taken into account.

Figure 7:
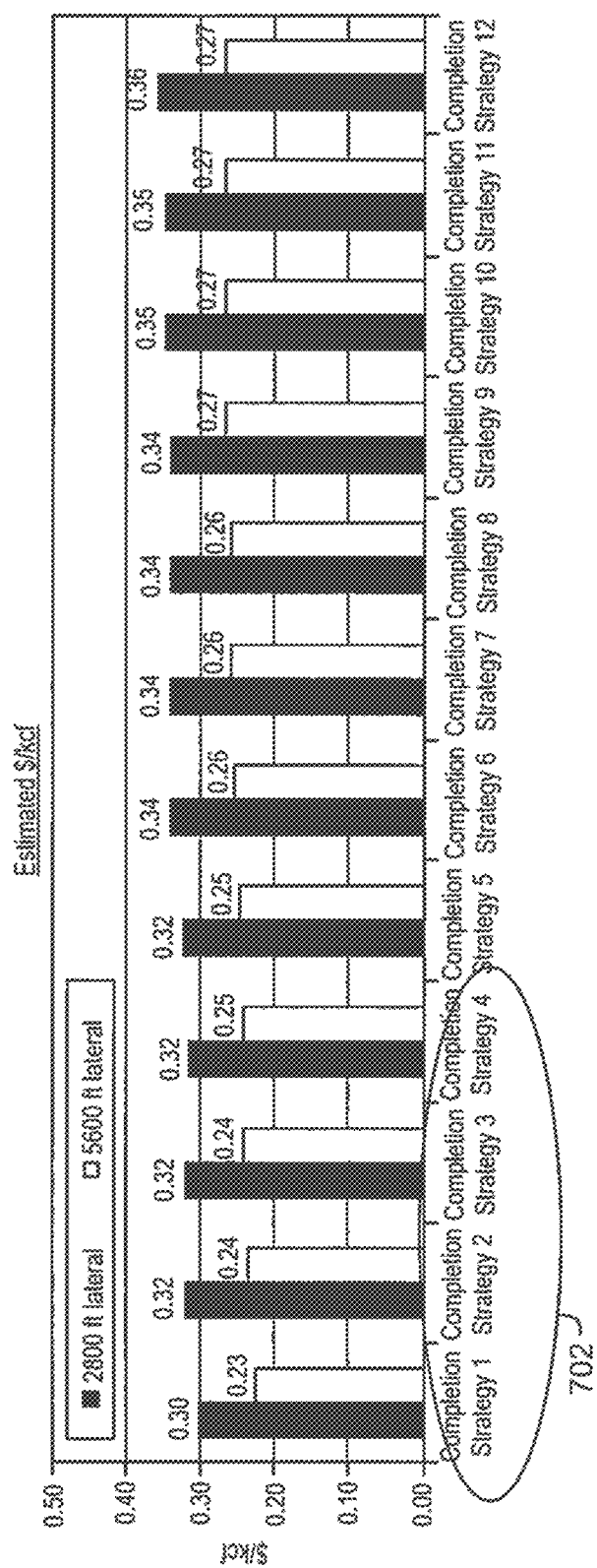
FIG. 7 shows a bar graph of cost per unit of hydrocarbon gas produced from each well.

FIG. 7 shows a bar graph 700 of cost per unit of hydrocarbon gas produced from each well. In this case, the goal of the well planning process is to minimize the cost per unit of produced gas for the well, which is directly related to the ROI of the well. Therefore, the graph 700 may output a result 702 that includes a number of wells with the lowest cost per unit of produced gas.

Computing System for Determining Parameters for a Well

Figure 8:
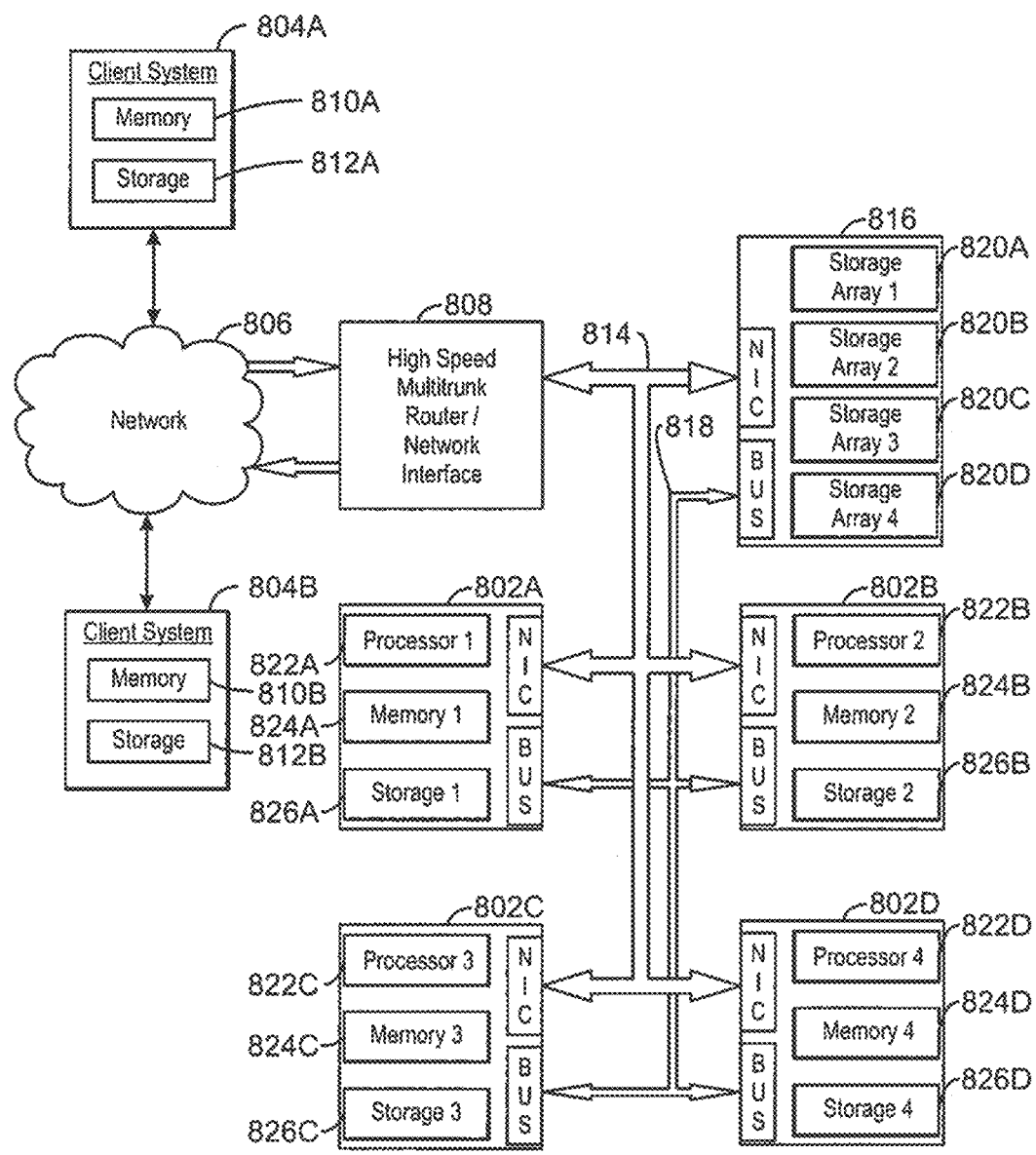
FIG. 8 is a block diagram of a cluster computing system that may be used to implement the well planning process described herein.

FIG. 8 is a block diagram of a cluster computing system 800 that may be used to implement the well planning process described herein. The cluster computing system 800 illustrated has four computing units 802A-D, each of which may perform calculations for a portion of the dynamic well planning process. However, one of ordinary skill in the art will recognize that the cluster computing system 800 is not limited to this configuration, as any number of computing configurations may be selected. For example, a smaller analysis may be run on a single computing unit, such as a workstation, while a large calculation may be run on a cluster computing system 800 having tens, hundreds, thousands, or even more computing units.

The cluster computing system 800 may be accessed from any number of client systems 804A and 804B over a network 806, for example, through a high speed network interface 808. The computing units 802A-D may also function as client systems, providing both local computing support and access to the wider cluster computing system 800.

The network 806 may include a local area network (LAN), a wide area network (WAN), the Internet, or any combinations thereof. Each client system 804A and 804B may include one or more non-transitory, computer-readable media for storing the operating code and programs that are used to implement the well planning process described herein. The non-transitory, computer-readable media may hold models for hydrocarbon production used for determining parameters such as well-engineering parameters, well locations, and ROI. For example, each client system 804A and 804B may include a memory device 810A and 810B, which may include random access memory (RAM), read only memory (ROM), and the like. Each client system 804A and 804B may also include a storage device 812A and 812B, which may include any number of hard drives, optical drives, flash drives, or the like.

The high speed network interface 808 may be coupled to one or more buses in the cluster computing system 800, such as a communications bus 814. The communication bus 814 may be used to communicate instructions and data from the high speed network interface 808 to a cluster storage system 816 and to each of the computing units 802A-D in the cluster computing system 800. The communications bus 814 may also be used for communications among the computing units 802A-D and the cluster storage system 816. In addition to the communications bus 814, a high speed bus 818 can be present to increase the communications rate between the computing units 802A-D and/or the cluster storage system 816.

The cluster storage system 816 can have one or more non-transitory, computer-readable media, such as storage arrays 820A-D for the storage of models, data, visual representations, results, code, or other information, for example, concerning the implementation of and results from the well planning process described herein. The storage arrays 820A-D may include any combinations of hard drives, optical drives, flash drives, or the like.

Each computing unit 802A-D can have a processor 822A-D and associated local non-transitory, computer-readable media, such as a memory device 824A-D and a storage device 826A-D. Each processor 822A-D may be a multiple core unit, such as a multiple core central processing unit (CPU) or a graphics processing unit (GPU). Each memory device 824A-D may include ROM and/or RAM used to store code for directing the corresponding processor 822A-D to implement the well planning process described herein. Each storage device 826A-D may include one or more hard drives, optical drives, flash drives, or the like, in addition each storage device 826A-D may be used to provide storage for models, intermediate results, data, images, or code associated with operations, including code used to implement the well planning process described herein.

The present techniques are not limited to the architecture or unit configuration illustrated in FIG. 8. For example, any suitable processor-based device may be utilized for implementing all or a portion of embodiments of the dynamic well planning process described herein, including without limitation personal computers, laptop computers, computer workstations, mobile devices, and multi-processor servers or workstations with or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Embodiments

Embodiments of the invention may include any combinations of the methods and systems shown in the following numbered paragraphs. This is not to be considered a complete listing of all possible embodiments, as any number of variations can be envisioned from the description above.

1. A method for determining well parameters for optimization of well performance, including:

training, via a computing system, a well performance predictor based on field data corresponding to a hydrocarbon field;

generating, via the computing system, a number of candidate well parameter combinations for the well;

predicting, via the computing system, a performance of the well for each of the number of candidate well parameter combinations using the trained well performance predictor; and determining, via the computing system, an optimized well parameter combination for the well such that the predicted performance of the well is maximized.

2. The method of paragraph 1, wherein the predicted performance of the well includes a predicted hydrocarbon production from the well.

3. The method of either of paragraphs 1 or 2, wherein the predicted performance of the well includes a predicted return on investment (ROI) of the well.

4. The method of any of paragraphs 1, 2, or 3, wherein the predicted performance of the well includes a predicted initial rate of hydrocarbon production from the well.

5. The method of any of paragraphs 1-4, wherein the predicted performance of the well includes a predicted net present value of hydrocarbon production from the well.

6. A method for determining well parameters based on expected return on investment, including:

training, via a computing system, a hydrocarbon production predictor based on field data corresponding to a hydrocarbon field;

generating, via the computing system, a number of candidate well parameter combinations for the well;

predicting, via the computing system, a hydrocarbon production and a corresponding uncertainty of the prediction for each of the number of candidate well parameter combinations using the trained hydrocarbon production predictor;

calculating, via the computing system, a cost of the well for each of the number of candidate well parameter combinations;

estimating, via the computing system, an expected return on investment (ROI) of the well for each of the number of candidate well parameter combinations based on the hydrocarbon production, the corresponding uncertainty, and the cost of the well for each of the number of candidate well parameter combinations; and determining, via the computing system, an optimized well parameter combination for the well such that the expected ROI is maximized.

7. The method of paragraph 6, including drilling and completing the well based on the optimized well parameter combination.

8. The method of either of paragraphs 6 or 7, including determining optimized well parameter combinations for a number of wells such that an overall expected ROI for drilling and completing the number of wells in the hydrocarbon field is maximized.

9. The method of any of paragraphs 6-8, including drilling and completing the number of wells based on the corresponding optimized well parameter combinations.

10. The method of any of paragraphs 6-9, including determining a location for the well in the hydrocarbon field prior to generating the number of candidate well parameter combinations.

11. The method of paragraph 10, including using a map of the hydrocarbon field to determine the location for the well, wherein the map includes an indication of a geologic contribution to hydrocarbon production for each region in the hydrocarbon field and an indication of a location of each existing well in the hydrocarbon field.

12. The method of any of paragraphs 6-11, including training the hydrocarbon production predictor using statistical learning techniques.

13. The method of any of paragraphs 6-12, including training the hydrocarbon production predictor using pattern recognition techniques.

14. The method of any of paragraphs 6-13, including training the hydrocarbon production predictor using machine learning techniques.

15. The method of any of paragraphs 6-14, wherein determining the optimized well parameter combination for the well such that the expected ROI is maximized includes executing an optimization process based on the hydrocarbon production, the corresponding uncertainty, and the cost of the well for each of the number of candidate well parameter combinations.

16. The method of any of paragraphs 6-15, including using a prediction
distribution provided by the hydrocarbon production predictor to predict the hydrocarbon production and the corresponding uncertainty of the prediction for each of the number of candidate well parameter combinations.

17. The method of any of paragraphs 6-16, including using statistics provided by the hydrocarbon production predictor to predict the hydrocarbon production and the corresponding uncertainty of the prediction for each of the number of candidate well parameter combinations.

18. The method of any of paragraphs 6-17, including determining the optimized well parameter combination for the well such that a risk associated with the well is minimized.

19. The method of any of paragraphs 6-18, including determining the optimized well parameter combination for the well such that a production rate of the well after a specified period of time is maximized.

20. The method of any of paragraphs 6-19, including determining the optimized well parameter combination for the well such that a production of a particular hydrocarbon is preferentially maximized over production of other fluids.

21. The method of any of paragraphs 6-20, including performing a workover on an existing well based on the optimized well parameter combination.

22. A computing system for determining well parameters based on expected return on investment, including:
a processor;
a storage medium including a hydrocarbon production predictor;
a non-transitory, computer-readable medium including code configured to direct the processor to:
generate a number of candidate well parameter combinations for a well;
predict a hydrocarbon production and a corresponding uncertainty of the prediction for each of the number of candidate well parameter combinations using the hydrocarbon production predictor;
calculate a cost of the well for each of the number of candidate well parameter combinations;
estimate an expected return on investment (ROI) of the well for each of the number of candidate well parameter combinations based on the hydrocarbon production, the uncertainty of the prediction, and the cost of the well for each of the number of candidate well parameter combinations; and
determine an optimized well parameter combination for the well such that the expected ROI is maximized.

23. The computing system of paragraph 22, wherein the non-transitory, computer-readable medium includes code configured to direct the processor to train the hydrocarbon production predictor based on field data corresponding to a hydrocarbon field.

24. The computing system of either of paragraphs 22 or 23, wherein the non-transitory, computer-readable medium includes code configured to direct the processor to determine a location for the well in a hydrocarbon field prior to generating the number of candidate well parameter combinations.

25. The computing system of any of paragraphs 22-24, wherein the non-transitory, computer-readable medium includes code configured to direct the processor to use a map of the hydrocarbon field to determine the location for the well, wherein the map includes an indication of a geologic contribution to hydrocarbon production for each region in the hydrocarbon field and an indication of a location of each existing well in the hydrocarbon field.

26. The computing system of any of paragraphs 22-25, wherein the non-transitory, computer-readable medium includes code configured to direct the processor to determine optimized well parameter combinations for a number of wells such that an overall expected ROI is maximized.

27. The computing system of any of paragraphs 22-26, wherein the computing system includes a cluster computing system.

28. The computing system of any of paragraphs 22-27, wherein the non-transitory, computer-readable medium includes code configured to direct the processor to determine the optimized well parameter combination for the well such that the expected ROI is maximized by executing an optimization process based on the hydrocarbon production, the uncertainty of the prediction, and the cost of the well for each of the number of candidate well parameter combinations.

29. The computing system of any of paragraphs 22-28, wherein the non-transitory, computer-readable medium includes code configured to direct the processor to use a prediction distribution provided by the hydrocarbon production predictor to predict the hydrocarbon production and the corresponding uncertainty of the prediction for each of the number of candidate well parameter combinations.

30. The computing system of any of paragraphs 22-29, wherein the non-transitory, computer-readable medium includes code configured to direct the processor to use statistics provided by the hydrocarbon production predictor to predict the hydrocarbon production and the corresponding uncertainty of the prediction for each of the number of candidate well parameter combinations.

31. The computing system of any of paragraphs 22-30, wherein the non-transitory, computer-readable medium includes code configured to direct the processor to determine the optimized well parameter combination for the well such that a risk associated with the well is minimized 32. The computing system of any of paragraphs 22-31, wherein the non-transitory, computer-readable medium includes code configured to direct the processor to determine the optimized well parameter combination for the well such that a production rate of the well after a specified period of time is maximized.

33. The computing system of paragraph 22, wherein the well includes an existing well, and wherein the non-transitory, computer-readable medium includes code configured to direct the processor to perform a workover on the existing well based on the optimized well parameter combinations.

34. A non-transitory, computer-readable medium for storing computer-readable instructions, the computer-readable instructions including code configured to direct a processor to:

train a hydrocarbon production predictor based on field data corresponding to a hydrocarbon field;

generate a number of candidate well parameter combinations for the well;

predict a hydrocarbon production and a corresponding uncertainty of the prediction for each of the number of candidate well parameter combinations using the trained hydrocarbon production predictor;

calculate a cost of the well for each of the number of candidate well parameter combinations;

estimate an expected return on investment (ROI) of the well for each of the number of candidate well parameter combinations based on the hydrocarbon production, the uncertainty of the prediction, and the cost of the well for each of the number of candidate well parameter combinations; and determine an optimized well parameter combination for the well such that the expected ROI is maximized.

35. The non-transitory, computer-readable medium of paragraph 34, wherein the computer-readable instructions include code configured to direct the processor to determine optimized well parameter combinations for a number of wells such that an overall expected ROI for drilling and completing the number of wells in the hydrocarbon field is maximized.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for determining well parameters for optimization of well performance, comprising:

training, via a computing system, a well performance predictor based on field data corresponding to a hydrocarbon field, generating, via the computing system, a plurality of candidate well parameter combinations for the well;

predicting, via the computing system, a performance of the well for each of the plurality of candidate well parameter combinations using the trained well performance predictor;

determining, via the computing system, an optimized well parameter combination for the well such that the predicted performance of the well is maximized, wherein the predicted performance comprises a hydrocarbon production and a corresponding uncertainty of the prediction; and causing a well to be drilled and completion to be installed in the well based on the optimized well parameter combination.

2. The method of claim 1, wherein the predicted performance of the well comprises a predicted hydrocarbon production from the well.

3. The method of claim 1, wherein the predicted performance of the well comprises a predicted return on investment (ROI) of the well.

4. The method of claim 1, wherein the predicted performance of the well comprises a predicted initial rate of hydrocarbon production from the well.

5. The method of claim 1, wherein the predicted performance of the well comprises a predicted net present value of hydrocarbon production from the well.

6. A method for determining well parameters for causing a well to be drilled, comprising:

training, via a computing system, a hydrocarbon production predictor based on field data corresponding to a hydrocarbon field;

generating, via the computing system, a plurality of candidate well parameter combinations for the well, predicting, via the computing system, a hydrocarbon production and a corresponding uncertainty of the prediction for each of the plurality of candidate well parameter combinations using the trained hydrocarbon production predictor;

calculating, via the computing system, a cost of the well for each of the plurality of candidate well parameter combinations, estimating, via the computing system, an expected return on investment (ROI) of the well for each of the plurality of candidate well parameter combinations based on the hydrocarbon production, the corresponding uncertainty of the prediction, and the cost of the well for each of the plurality of candidate well parameter combinations;

determining, via the computing system, an optimized well parameter combination for the well such that the expected ROI is maximized; and causing a well to be drilled and completion installed in the well based on the optimized well parameter combination.

7. The method of claim 6, comprising drilling and completing the well based on the optimized well parameter combination.

8. The method of claim 6, comprising determining optimized well parameter combinations for a plurality of wells such that an overall expected ROI for drilling and completing the plurality of wells in the hydrocarbon field is maximized.

9. The method of claim 6, comprising drilling and completing the plurality of wells based on the corresponding optimized well parameter combinations.

10. The method of claim 6, comprising determining a location for the well in the hydrocarbon field prior to generating the plurality of candidate well parameter combinations.

11. The method of claim 10, comprising using a map of the hydrocarbon field to determine the location for the well, wherein the map comprises an indication of a geologic contribution to hydrocarbon production for each region in the hydrocarbon field and an indication of a location of each existing well in the hydrocarbon field.

12. The method of claim 6, comprising training the hydrocarbon production predictor using statistical learning techniques.

13. The method of claim 6, comprising training the hydrocarbon production predictor using pattern recognition techniques.

14. The method of claim 6, comprising training the hydrocarbon production predictor using machine learning techniques.

15. The method of claim 6, wherein determining the optimized well parameter combination for the well such that the expected ROI is maximized comprises executing an optimization process based on the hydrocarbon production, the corresponding uncertainty of the prediction, and the cost of the well for each of the plurality of candidate well parameter combinations.

16. The method of claim 6, comprising using a prediction distribution provided by the hydrocarbon production predictor to predict the hydrocarbon production and the corresponding uncertainty of the prediction for each of the plurality of candidate well parameter combinations.

17. The method of claim 6, comprising using statistics provided by the hydrocarbon production predictor to predict the hydrocarbon production and the corresponding uncertainty of the prediction for each of the plurality of candidate well parameter combinations.

18. The method of claim 6, comprising determining the optimized well parameter combination for the well such that a risk associated with the well is minimized.

19. The method of claim 6, comprising determining the optimized well parameter combination for the well such that a production rate of the well after a specified period of time is maximized.

20. The method of claim 6, comprising determining the optimized well parameter combination for the well such that a production of a particular hydrocarbon is preferentially maximized over production of other fluids.

21. The method of claim 6, comprising performing a workover on an existing well based on the optimized well parameter combination.

22. A computing system for determining well parameters based on expected return on investment, comprising:
  a processor;
  a storage medium comprising a hydrocarbon production predictor;
  a non-transitory, computer-readable medium comprising code configured to direct the processor to:
    generate a plurality of candidate well parameter combinations for a well;
    predict a hydrocarbon production and a corresponding uncertainty of the prediction for each of the plurality of candidate well parameter combinations using the hydrocarbon production predictor;
    calculate a cost of the well for each of the plurality of candidate well parameter combinations;
    estimate an expected return on investment (ROI) of the well for each of the plurality of candidate well parameter combinations based on the hydrocarbon production, the corresponding uncertainty of the prediction, and the cost of the well for each of the plurality of candidate well parameter combinations;
    determine an optimized well parameter combination for the well such that the expected ROI is maximized; and
    display a notification to cause a well to be drilled and a completion to be installed in the well based on the optimized well parameter combination.

23. The computing system of claim 22, wherein the non-transitory, computer-readable medium comprises code configured to direct the processor to train the hydrocarbon production predictor based on field data corresponding to a hydrocarbon field.

24. The computing system of claim 22, wherein the non-transitory, computer-readable medium comprises code configured to direct the processor to determine a location for the well in a hydrocarbon field prior to generating the plurality of candidate well parameter combinations.

25. The computing system of claim 24, wherein the non-transitory, computer-readable medium comprises code configured to direct the processor to use a map of the hydrocarbon field to determine the location for the well, wherein the map comprises an indication of a geologic contribution to hydrocarbon production for each region in the hydrocarbon field and an indication of a location of each existing well in the hydrocarbon field.

26. The computing system of claim 22, wherein the non-transitory, computer-readable medium comprises code configured to direct the processor to determine optimized well parameter combinations for a plurality of wells such that an overall expected ROI is maximized.

27. The computing system of claim 22, wherein the computing system comprises a cluster computing system.

28. The computing system of claim 22, wherein the non-transitory, computer-readable medium comprises code configured to direct the processor to determine the optimized well parameter combination for the well such that the expected ROI is maximized by executing an optimization process based on the hydrocarbon production, the corresponding uncertainty of the prediction, and the cost of the well for each of the plurality of candidate well parameter combinations.

29. The computing system of claim 22, wherein the non-transitory, computer-readable medium comprises code configured to direct the processor to use a prediction distribution provided by the hydrocarbon production predictor to predict the hydrocarbon production and the corresponding uncertainty of the prediction for each of the plurality of candidate well parameter combinations.

30. The computing system of claim 22, wherein the non-transitory, computer-readable medium comprises code configured to direct the processor to use statistics provided by the hydrocarbon production predictor to predict the hydrocarbon production and the corresponding uncertainty of the prediction for each of the plurality of candidate well parameter combinations.

31. The computing system of claim 22, wherein the non-transitory, computer-readable medium comprises code configured to direct the processor to determine the optimized well parameter combination for the well such that a risk associated with the well is minimized.

32. The computing system of claim 22, wherein the non-transitory, computer-readable medium comprises code configured to direct the processor to determine the optimized well parameter combination for the well such that a production rate of the well after a specified period of time is maximized.

33. The computing system of claim 22, wherein the well comprises an existing well, and wherein the non-transitory, computer-readable medium comprises code configured to direct the processor to perform a workover on the existing well based on the optimized well parameter combinations.

34. A non-transitory, computer-readable medium for storing computer-readable instructions, the computer-readable instructions comprising code configured to direct a processor to:
   train a hydrocarbon production predictor based on field data corresponding to a hydrocarbon field;
   generate a plurality of candidate well parameter combinations for the well;
   predict a hydrocarbon production and a corresponding uncertainty of the prediction for each of the plurality of candidate well parameter combinations using the trained hydrocarbon production predictor;
   calculate a cost of the well for each of the plurality of candidate well parameter combinations;
   estimate an expected return on investment (ROI) of the well for each of the plurality of candidate well parameter combinations based on the hydrocarbon production, the corresponding uncertainty of the prediction, and the cost of the well for each of the plurality of candidate well parameter combinations;
   determine an optimized well parameter combination for the well such that the expected ROI is maximized; and
   display a notification to cause a well to be drilled and a completion to be installed in the well based on the optimized well parameter combination.

35. The non-transitory, computer-readable medium of claim 34, wherein the computer-readable instructions comprise code configured to direct the processor to determine optimized well parameter combinations for a plurality of wells such that an overall expected ROI for drilling and completing the plurality of wells in the hydrocarbon field is maximized.

* * * * *